United States Patent Office 3,717,596
Patented Feb. 20, 1973

3,717,596
CARBODIIMIDE FOAMS AND PROCESS FOR PREPARING CARBODIIMIDE FOAMS FROM CO-CATALYST SYSTEMS
Peter T. Kan, Plymouth, Moses Cenker, Trenton, and John T. Patton, Jr., Wyandotte, Mich., assignors to BASF Wyandotte Corporation, Wyandotte, Mich.
No Drawing. Filed Aug. 5, 1971, Ser. No. 169,470
Int. Cl. C08g 22/44, 22/38
U.S. Cl. 260—2.5 BF          15 Claims

ABSTRACT OF THE DISCLOSURE

Rigid cellular foam compositions characterized by carbodiimide linkages are prepared by catalytically condensing an organic polyisocyanate in the presence of 2,4,6-tris(N-methylethanolamino)-s-triazine or, alternatively, in the presence of a co-catalyst system of (a) 2,4,6-tris(N-methylethanolamino)-s-triazine and (b) catalyst selected from the group consisting of (1) 1,3,5-tris(N,N-dialkylaminoalkyl)-s-hexahydrotriazine, (2) 2,4,6-tris(dimethylaminoethyl) phenol, (3) o-, p-, and a mixture of o- and p-dimethylaminomethylphenol, and (4) an organotin compound.

BACKGROUND OF THE INVENTION (1) Field of the invention

The present invention concerns cellular foam compositions and methods of preparation therefor. More particularly, the present invention concerns novel carbodiimide foam compositions and methods of preparation therefor. Even more particularly, the present invention concerns novel carbodiimide foam compositions prepared by the catalystic condensation of an organic polyisocyanate.

(2) Prior art

In copending application, U.S. Ser. No. 5985, entitled "Carbodiimide Foam Composition and Process for the Preparation Therefor," filed Jan. 26, 1970, now U.S. Pat. No. 3,645,923, the disclosure of which is hereby incorporated by reference, there is disclosed a novel rigid foam, characterized by carbodiimide linkages and which is prepared by the catalystic condensation of an organic polyisocyanate in the presence, of a 2,4,6-tris(dialkanolamino)-s-triazine catalyst.

To improve certain deficiencies in the process of the above-referred to patent application, U.S. Ser. No. 28,-555, entitled "Carbodiimide Foams and Improved Process for Preparing Same," filed Apr. 13, 1970 now abandoned, the disclosure of which is also hereby incorporated by reference, teaches these novel rigid foam compositions, characterized by carbodiimide linkages, wherein the foams are prepared by catalytically condensing an organic polyisocyanate in the presence of a catalytically sufficient amount of co-catalyst system consisting essentially of the 2,4,6-tris(dialkanolamino)-s-triazine and a 1,3,5-tris(N,N-dialkylaminoalkyl)-s-hexahydrotriazine.

To further improve these systems other co-catalyst systems are disclosed in U.S. patent application Ser. No. 118,994, entitled "Carbodiimide Foams and Process for Preparing Carbodiimide Foams from Co-Catalyst Systems," filed, Feb. 25, 1971, the disclosure of which is, also, hereby incorporated by reference. According to this latter application, either 2,4,6-tris(dimethylaminomethyl) phenol, a mixture of o- and p-(dimethylaminomethyl) phenol or an organotin compound is used conjointly with the 2,4,6-tris(dialkanolamino)-s-triazine to prepare the foams.

Thus, it is seen that in each application the dominant or primary catalyst is a 2,4,6-tris(dialkanolamino)-s-triazine, and in particular 2,4,6-tris(diethanolamino)-s-triazine. The use of such a catalyst has certain inherent drawbacks. One of the primary drawbacks is the difficulty in preparing the compound. Its isolation from the reagents is extremely difficult and provides low yields. Morevoer, 2,4,6-tris(diethanolamino)-s-traizine, which has a melting point of about 177° C., is not appreciably soluble in the organic polyisocyanates thereby greatly fore-closing use of a uniform dispersion of catalyst in polyisocyanate, which, in turn, effectively inhibits production of foams from a completely homogeneous mix.

Thus, an advancement in the art would be provided by a primary catalyst which overcomes these drawbacks, while maintaining the advantages described in the copending applications.

SUMMARY OF THE INVENTION

In accordance with the present invention, rigid cellular foams, characterized by carbodiimide linkages, are prepared by condensing an organic polyisocyanate in the presence of a catalytically sufficient amount of 2,4,6-tris(N-methylethanolamino)-s-triazine at an intitation temperature of about 100° C.

The present invention further provides a process for preparing rigid carbodiimide foams at a temperature ranging from about 25° C. to 100° C. by utilizing a co-catalyst system which employs some commercially available products, but which advantageously provides a variety of catalytic systems which can be used to prepare these rigid cellular foams. The co-catalyst systems which achieve these results consist essentially of a mixture of (a) 2,4,6-tris(N-methylethanolamino)-s-triazine, and (b) a compound selected from the group consisting of (1) 1,3,5-tris(N,N-dialkylaminoalkyl) - s-hexahydrotriazine, (2) 2,4,6-tris(dimethylaminomethyl) phenol, (3) o-, p- and a mixture of o- and p-(dimethylaminomethyl) phenol, and (4) organotin compound, each component of the co-catalyst system being present in catalytically sufficient quantities.

Thus, the present invention is seen to provide rigid carbodiimide foam compositions by the catalytic condensation of an organic polyisocyanate in the presence of a catalytically sufficient amount of either a novel primary catalyst or a co-catalyst system thereof and wherein the reaction is initiated at a temperature ranging from about room temperature (25° C.) to about 100° C.

For a more comprehensive discussion of the present inveniton reference is made to the following detailed description and examples thereof.

DESCRIPTION OF THE PREFERRED EMBODIMENT

In accordance with the present invention, novel rigid foam compositions are prepared by the catalytic condensation of an organic polyisocyanate in the presence of either 2,4,6-tris(N-methylethanolamino)-s-triazine or a co-catalyst system thereof consisting essentially of (a) the 2,4,6-tris(N-methylethanolamino)-s-triazine and (b) a compound selected from the group consisting of (1) 1,3,-5-tris(N,N-dialkylaminoalkyl) - s-hexahydrotriazine, (2) 2,4,6-tris(dimethylaminomethyl) phenol, (3) o-, p-, and a mixture of o- and p-(dimethylaminomethyl) phenol, and (4) organotin compound.

It appears that the foam forming reaction of the present invention proceeds in accordance with the following equation:

$$R-NCO + OCN-R^1 \xrightarrow{\text{catalyst}} R-N=C=N-R^1 + CO_2$$

wherein R and $R^1$ are each polyvalent organic radicals which may be the same or different. The evolution of carbon dioxide by the reaction provides a sufficient blowing agent for inducing and promoting foam formation. Thus, one readily apparent advantage of the present invention is seen to be that the necessity for additional blowing agents is obviated. Furthermore, the reaction is exothermic and the heat generated therefrom also promotes foam formation. But it is the self-evolution of carbon dioxide which is essential in the formation of the foams of the present invention.

The mechanism by which the triazine catalyzes the condensation reaction is not known. However, it has been found, that this compound is quite specific inasmuch as the related, unmethylated compound, 2,4,6-tris(ethanolamino)-s-triazine is ineffective. It should also be observed that the present primary catalyst, although related, is distinct from the 2,4,6-tris (dialkanolamino)-s- triazines. The present compound, which is not a homolog of the 2,4,6-tris(dialkanolamino)-s-triazines, is soluble in organic polyisocyanates, at temperatures above 50° C., is more easily prepared and in better yields, than the heretofore disclosed primary catalysts and, having a melting point of about 70° C., makes its handling much easier than the previous catalysts. Also, and most critical, it is more compatible with the co-catalyst compounds, making a blend thereof more readily dispersible, since the blend is a liquid.

The precise mechanism by which the co-catalyst system promotes foam formation in the present invention is not known, either. It would appear, however, that this reaction proceeds as follows; initially, some of the isocyanate groups of the polyisocyanate are trimerized thereby forming isocyanurate rings. This reaction is highly exothermic and the heat generated thereby works in conjunction with and activates the triazine component of the co-catalyst system to continue the isocyanurate formation and to promote the carbodiimide formation from the remaining isocyanate groups provided by the organic polyisocyanate. The basis for this explanation lies in the fact that the above indicated group (b) compounds employed in the co-catalyst system are known to be isocyanate trimerization promoting compounds. See, for instance, L. Nicholas and G. T. Gmitter, J. of Cell, Plastics, 1, 85 (1965), and U.S. Pat. Nos. 3,386,197 and 3,450,701, as well as the above-referred to copending patent application, U.S. Ser. No. 28,555.

As stated above, the foam compositions of the present invention are characterized by carbodiimide or

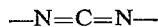

linkages. Less dominant groups within the foams are isocyanate and the above noted isocyanurate rings or linkages. However, it is the carbodiimide linkages which are critical hereto and which impart the excellent physical properties to the foam composition of the present invention.

The organic polyisocyanates which are advantageously employed in the present invention can be represented by the formula:

wherein R is a polyvalent organic radical selected from the group of aliphatic, aromatic, arylalkyl and alkylaryl organic radicals as well as mixtures thereof; and z is an integer corresponding to the valence number of R and is at least 2. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4''-triphenylmethylene triisocyanate, 2,4,6-toluene triisocyanates; the aromatic tetraisocyanates, such as 4,4'-dimethyldiphenylmethane-2,2'-5,5'-tetraisocyanate, and the like; arylalkyl polyisocyanates, such as xylylene diisocyanate; aliphatic polyisocyanates, such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene - 1,5 - diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate.

These polyisocyanates are prepared by conventional methods known in the art such as the phosgenation of the corresponding organic amine.

Still another class of organic polyisocyanates contemplated by the present invention are the so-called "quasi-prepolymers." These quasi-prepolymers are prepared by reacting an excess of organic polyisocyanate or mixtures thereof with a minor amount of an active hydrogen containing compound as determined by the well-known Zerewitinoff test, as described by Kohler in J. Am. Chem. Soc., 49, 3181 (1927). These compounds and their methods of preparation are well known in the art. The use of any one specific active hydrogen compound is not critical hereto, rather, any such compound that can be used to prepare a quasi-prepolymer can be employed herein. Generally speaking, the quasi-prepolymers are prepared by reacting an organic polyisocyanate with less than a stoichiometric amount, based on the weight of the polyisocyanate, of the active hydrogen containing compound.

Suitable active hydrogen-containing groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxyl-containing polyesters, polyalkylene ether polyols, hydroxy-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic, aliphatic, and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxyl-containing polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1 - trimethylolethane, hexane-1,2,6-triol, α-methyl glucoside, pentaerythritol, and sorbitol. Also included within the term "polyhydric alcohol" are compounds derived from phenol such as 2,2-(4,4'-hydroxyphenol)propane, commonly known as Bisphenol A.

Any suitable polyalkylene ether polyol may be used such as the polymerization product of an alkylene oxide or of an alkylene oxide with a polyhydric alcohol. Any bis(triisopropyltin)oxide, bis(tri-n-butyltin)oxide, bis(triphenyltin)oxide, and the like.

In the practice of the present invention the organotin compound is preferably either triorganotin alkoxide or bis(triorganotin)oxide and, in particular, either tri-n-butyltin methoxide, (bis(tri-n-butyltin)oxide or bis(triphenyltin)oxide.

The triorganotin alkoxides are generally prepared by reacting the corresponding organotin halide with alkali metal alkoxide. Thus, tri-n-butyltin chloride may be reacted with sodium methoxide to prepare tri-n-butyltin methoxide.

The bis(triorganotin) oxides are generally prepared by the hydrolysis of the corresponding organotin halide with alkali metal hydroxide followed thereafter by the dehydration of the resulting organotin hydroxide.

For a more complete discussion of the organotin compounds contemplated for use herein reference may be made to the above-cited U.S. Pat. No. 3,396,167, the disclosure of which is hereby incorporated by reference.

When the 2,4,6-tris(N-methylethanolamino)-s-triazine is used alone, it is generally employed in an amount ranging from about 0.1 to 20 parts by weight thereof per 100 parts by weight of organic polyisocyanate. Preferably, from about 0.5 to 5 parts by weight of this triazine compound per 100 parts by weight of organic polyisocyanate is employed in catalyzing the reaction.

Generally, the co-catalyst system of the present invention is employed in a weight ratio of triazine to trimerization promoting compound or trimer catalyst ranging from about 1:10 to 10:1. Preferably, a weight ratio of triazine to trimer catalyst ranging from about 1:4 to 4:1 is employed.

In the preparation of the foam compositions of the present invention, generally, from about 0.1 to 20 parts by weight of co-catalyst system per 100 parts by weight of organic polyisocyanate, is employed. Preferably from about 0.5 to 10 parts by weight of co-catalyst system per 100 parts by weight of organic polyisocyanate is utilized.

In accordance with, and in a first embodiment of the present invention, the present foam compositions are prepared by mixing together the organic polyisocyanate and the 2,4,6-tris(N-methylethanolamino)-s-triazine. This mixture is then heated with agitation to about 100° C. for about 5 to 60 minutes at which point the reaction is initiated, as evidenced by the evolution of carbon dioxide and the generation of an exotherm. It is to be understood however, that lower initiation temperatures can be used, but this prolongs the time required for commencement of the reaction.

In accordance with and in a second preferred embodiment of the present invention, the present foam compositions are prepared by mixing together the organic polyisocyanate and the triazine component of the co-catalyst system. This mixture is then heated, with agitation, until the desired initiating temperature is reached, which is usually between 25° C. and 100° C. When the initiating temperature is reached, then the trimerization promoting compound is added to the mixture. This procedure is utilized since it has been found that by heating the mixture of triazine and isocyanate to the desired initiating temperature, the trimerization promoting compound is catalytically effective immediately upon its introduction into the system thereby facilitating isocyanurate formation, which in turn initiates carbodiimide formation and the accompanying evolution of carbon dioxide.

It is to be understood, however, that the reaction can be initiated at room temperature by merely adding the co-catalyst system to the organic polyisocyanate. With agitation and after the induction period has elapsed, foam formation occurs.

A third method for practicing the present invention comprises heating the organic polyisocyanate to the desired initiating temperature and then, with vigorous agitation, adding a premix of the co-catalyst system thereto.

Other suitable methods for introducing the co-catalyst system to the polyisocyanate include heating the polyisocyanate to the desired initiating temperature and then adding each compound of the co-catalyst system thereto, individually.

In practicing any embodiment of the invention it is to be remembered that in selecting the desired initiating temperature, it is necessary to consider the desired properties of the resultant foam. For example, temperatures approaching 100° C. will provide foams having a lighter density than those prepared at a lower temperature. However, foam formation will proceed more rapidly at elevated temperatures. The desired temperature is determined solely by empirical selection.

In any event, all the methods for foam formation outlined above are practicable herein.

With the addition of the co-catalyst system to the polyisocyanate the reaction commences almost immediately and usually begins in about two to ten seconds. Commencement of the reaction is evidenced by an increase in temperature within the reaction vessel because of the exothermic nature of the isocyanurate formation reaction. Generally, the temperature will rise to a temperature of about 100° C. to 200° C. In addition to the increase in temperature, the carbodiimide reaction is evidenced by the evolution of carbon dioxide. After about 1 to 10 minutes the foam reaction is completed. The time necessary to complete the reaction is, of course, dependent on the type and the amount of polyisocyanate and the amount of co-catalyst system employed.

Various other ingredients can be incorporated into the rigid foams of the present invention to enhance the properties thereof. For example, minor amounts of active ingredients such as organic active hydrogen containing compounds, e.g., organic polyols and polyamines, can be employed. Generally, from about 1 to 20 parts by weight of polyhydric compound per 100 parts by weight of polyisocyanate can be used herein. In addition, various surfactants, plasticizers and filler materials can also be employed herein in amounts ranging from 1 to 75 parts by weight of each per 100 parts by weight of polyisocyanate.

The organic polyhydric active hydrogen compounds that can be used as a separate ingredient are the same as those used in the formation of the above-mentioned "quasi-prepolymer."

Representative of the surfactants are the well-known silicone-based polysiloxane surfactants or oxyalkylated derivatives thereof.

Filler materials such as calcium carbonate, barium sulfate, calcium oxide, amomnium polyphosphate, and the like can also be employed in the foam preparation. Also, plasticizers, such as tris(beta-chloroethyl)phosphate and dioctyl phthalate are contemplated for use herein.

The final foam products obtained by the practice of the present invention generally have densities ranging from about 0.5 to 20.0 pounds per cubic foot and usually from about 0.8 to 16.0 pounds per cubic foot. These foam compositions, which are rigid, cellular plastics, are suitable replacements for the heretofore known foams in many applications such as insulating materials and the like. In addition, it has been found that these foam compositions exhibit excellent flame retardancy and low smoke densities.

To more fully illustrate the present invention, following are specific examples of the present invention which are not to be construed as being unduly limitative thereof. In the examples, all parts are by weight, absent indications to the contrary.

EXAMPLE I

This example illustrates the preparation of a foam utilizing only the primary catalysts, 2,4,6-tris(N-methylethanolamino)-s-triazine.

To a suitable reaction vessel equipped with a magnetic stirrer and heating means was added a mixture of 0.5 g. of 2,4,6-tris(N-methylethanolamino)-s-triazine and 50 g.

suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and Encyclopedia of Chemical Technology, vol. 7, pp. 257–262, published by Interscience Publishers, Inc. (1951) or in U.S. Pat. No. 1,922,459.

Any suitable polyhydric polythioether may be used such as, for example, the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtainaed by condensing an amino alcohol such as ethanolamine with the polycarboxylic acids set forth above, or they may be made using the same components that make up the hydroxyl-containing polyester with only a portion of the components being a diamine such as ethylene diamine.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Any suitable polyamine may be used including aromatic polyamines such as p-aminoaniline, 1,5-diaminonaphthalene, and 2,4-diaminotoluene, aliphatic polyamines such as, ethylenediamine, 1,3-propylenediamine, 1,4-butylenediamine, and 1,3-butylenediamine, as well as substituted secondary derivatives thereof.

Other compounds which do not necessarily fit within any of the previously set forth classes of compounds which are quite suitable in the production of the quasiprepolymers include the hydroxy-terminated polyurethane polymers such as hydroxy-terminated polymer made by reacting an isocyanate with several moles of an alkylene glycol.

The triazine compound, which is used either singularly, or in the co-catalyst system, as hereinbefore noted, is 2,4,6-tris(N-methylethanolamino)-s-triazine. Preparation of this compound generally comprises condensing cyanuric chloride with N-methylethanolamine in the presence of a neutralizing amount of a base compound, such as, sodium hydroxide, sodium bircarbonate and the like. This triazine compound and its method of preparation is more fully described in copending U.S. Patent application Ser. No. 215,675, filed Jan. 5, 1972 and entitled Process for the Preparation of 2,4,6-Tris(Disubstituted Amino)-s-Triazines, the disclosure of which is hereby incorporated by reference and in U.S. Pat. No. 3,573,301.

When utilizing a co-catalyst system based on 2,4,6-tris(N-methylethanolamino)-s-triazine, the trimerization promoting compound of the co-catalyst system is selected from the group consisting of (1) 1,3,5-tris(N,N-dialkylaminoalkyl)-s-hexahydrotriazine, (2) 2,4,6-tris(dimethylaminomethyl)phenol, (3) o-, p- or a mixture of o- and p-(dimethylaminomethyl)phenol and (4) organotin compound. As noted hereinbefore, these compounds are known as trimerization catalysts since they promote trimerization of isocyanate groups to form isocyanurate linkages in an exothermic reaction.

The hexahydrotriazine compound of the co-catalyst group is generally prepared by reacting at a temperature of about 0° C. to 20° C. and at atmospheric pressure, equimolar amounts of a dialkylaminoalkylamine and a 37% aqueous solution of formaldehyde. More particularly, the amine and the formaldehyde are mixed together with gentle stirring at about 0° C. Thereafter, and with continuous gentle stirring the resulting mixture is allowed to warm up to room temperature. The hexahydrotriazine is then recovered by first salting out the hexahydrotriazine from the mixture with a base compound such as sodium hydroxide or potassium hydroxide and then purifying by distillation. Thus, for example, 1,3,5 - tris(N,N - dimethyl-3-aminopropyl)-s-hexahydrotriazine is prepared by mixing together at 0° C. dimethylaminopropylamine and a 37% aqueous solution of formaldehyde. After reaching room temperature, the resultant mixture has added thereto sodium hydroxide and thereafter the hexahydrotriazine is separated and recovered by distillation. These hexahydrotriazine components and their method of preparation are more particularly described by Nicholas et al., supra, and by Graymore, Journal of the Chemical Society, 1943 (1931).

The second and third compounds of this group of co-catalysts are commercially available products sold by Rohm and Haas under the names DMP–30 and DMP–10, respectively. With regard to the latter, (dimethylaminomethyl)phenol, this is generally available commercially as an isomeric mixture of o- and p-(dimethylaminomethyl)phenol. These compounds are generally prepared by the condensation reaction of phenol, formaldehyde and dimethylamine.

The organotin compounds contemplated for use herein generally correspond to the formula:

$$(R'')_3SnOR'''$$

wherein R'' is selected from the group consisting of alkyl, aryl and alkenyl and R''' is selected from the group consisting of alkyl, aryl, alkenyl and —SnR₃. Typical R'' groups, where R'' is alkyl, include, for example, methyl, ethyl, n-propyl, isopropyl, n-butyl, sec-butyl, t-butyl, the amyls, hexyls, heptyls, octyls and the like. When R'' is aryl, it may be phenyl, naphthyl, anthryl, phenanthryl or the like. Typical R'' groups, when R'' is alkenyl, include, for example, allyl, 1-propenyl, methallyl, buten-2-yl, buten-3-yl, and so forth. It is to be further understood that R'' may also contain inert substituents such as alkyl, cycloalkyl, alkylaryl, alkenyl, ether, halogen and the like.

R''' may be any of the groups described for R'' as well as being (R'')₃Sn— which then renders R''SnOR''' equivalent to (R''₃Sn)₂O.

(R'')₃SnOR''' may be triorganotin alkoxide or aryloxide, such as, trimethyltin methoxide, triethyltin ethoxide, tri-n-propyltin ethoxide, triisopropyltin methoxide, tri-n-butyltin methoxide, tri-n-butyltin ethoxide, tri-n-propyltin phenoxide, tri-n-butyltin phenoxide, triphenyltin 2-ethylhexoxide, and the like.

(R'')₃SnO(R''')₃ may be a bis(triorganotin) oxide such as bis(triethyltin)oxide, bis(tri-n-propyltin)oxide, of an 80:20 weight mixture of 2,4- and 2,6-toluene diisocyanate. The mixture was then heated, with stirirng, to about 100° C. After about nine minutes the reaction commenced as evidenced by the evolution of carbon dioxide and the generation of an exotherm within the vessel. About one minute after commencement of the reaction, the temperature within the vessel rose to 192° C. The resulting foam occupied a volume of 800 mls. Infrared spectrum of the foam showed the presence of carbodiimide and isocyanurate absorption peaks.

EXAMPLE II

This example provides a further illustration of foam formation utilizing only the primary catalyst.

Following the procedure of Example I, a mixture of 0.25 g. of 2,4,6-tris(N-methylethanolamino)-s-triazine and 50 g. of the organic polyisocyanate used in Example I were added to the vessel. After 6 minutes of maintaining the mixture at about 100° C., the reaction commenced. Two minutes after the reaction commenced a maximum exotherm of 188° C. was reached. The resutling rigid foam had a volume of about 600 ml. The infrared spectrum of the foam indicated the presence of carbodiimide and isocyanurate groups.

EXAMPLE III

This example illustrates the preparation of a rigid cellular foam of the present invention wherein the reaction is catalyzed with a co-catalyst system.

To a 400 ml. beaker at room temperature (25° C.) was added a mixture of 200 g. of the organic polyisocyanate of Example I, 1.52 g. of 2,4,6 - tris(N - methylethanolamino)-s-triazine, 10 g. of a plasticizer [1] and 1.0 g. of a surfactant [2]. This mixture was stirred until well mixed. With vigorous agitation, 0.24 g. of 1,3,5 - tris(N,N-dimethyl - 3-aminopropyl)-s-hexahydrotriazine was rapidly added to the mixture. After about one minute an exotherm developed and a rapid temperature rise in the beaker was observed. When the temperature of the mixture approached 115° C., the mixture was transferred to a one-gallon bucket. Within the next two minutes, a foam was rapidly formed as the temperature of the foam rose to 130° C. The resulting foam occupied a volume of about 1.25 gallons and had a density of about 1.08 pounds/cubic feet and a closed cell content of 57.3%.

[1] Tris(2-chloroethyl) phosphate.
[2] A polysiloxane surfactant sold by Dow Corning under the name DC-193.

EXAMPLES IV–IX

Following the procedure of Example III, a series of foams were prepared from different organic polyisocyanates and/or isocyanate trimerization co-catalyst using 2,4,6-tris(N-methylethanolamino)-triazine[TMT] as the primary catalyst.

Table I, below sets forth the ingredients and amounts thereof used to prepare the foam. In addition, Table I also shows the initiating temperature employed at which the trimer catalyst was added to the initial charge of ingredients. It should be noted also that in each instance where plasticizers, surfactants, and the like were used, they were incorporated in the initial charge of organic polyisocyanate and triazine, to facilitate their introduction.

TABLE I.—CARBODIIMIDE FOAM FORMULATIONS

| Example | Isocyanate, p.b.w. TDI [1] | MDI [2] | 4,4'-methylene dianiline | Primary catalyst TMT | Co-catalyst TDH [3] | TBTO [4] | TPTO [5] | Plasticizer [6] | Surfactant [6] | Initiation temp., ° C. | Foam density, lbs./cu. ft. | Closed cell content, percent |
|---|---|---|---|---|---|---|---|---|---|---|---|---|
| IV | 4 | 6 | | 0.15 | 0.05 | | | 0.5 | 0.5 | 60 | 1.46 | 16.9 |
| V | 4 | 6 | | 0.15 | 0.05 | | | 0.5 | | 7.0 | 5.46 | 5.5 |
| VI | 10 | | | 0.1 | | | 0.1 | | 0.003 | 80 | 0.82 | 1.6 |
| VII | 10 | | | 0.1 | | 0.1 | | | 0.025 | 80 | 0.69 | 21.4 |
| VIII [7] | 2.5 | 7.5 | 0.2 | 0.1 | 0.1 | | | 0.5 | 0.05 | 45 | 7.86 | 36 |
| IX [7] | 2.5 | 7.5 | 0.2 | 0.2 | 0.1 | | | 0.5 | 0.05 | 45 | 6.12 | 40 |

[1] An 80:20 weight mixture of 2,4- and 2,6- toluene diisocyanate.
[2] Crude methylene diphenyl diisocyanate.
[3] 1,3,5-tris(N,N-dimethyl-3-aminopropyl)-s-hexahydrotriazine.
[4] Bis(tri-N-butyltin)oxide.
[5] Bis(triphenyltin)oxide.
[6] Same as in Example III.
[7] Quasi-prepolymer having a free-NCO content of 33.5% prepared by heating the MDI, TDI and the dianiline to about 40° C.

EXAMPLES X–XII

These examples illustrate the preparation of the foams of the present invention using a blend of the co-catalyst in accordance with the following procedure:

To a suitable reaction vessel equipped with heating means and agitation means was charged an organic polyisocyanate. After the polyisocyanate was heated to the desired initiation temperature, a co-catalyst blend was added thereto. The blend was prepared by previously mixing together the triazine compound and the trimerization compound to form a homogeneous liquid mixture.

Shortly after the blend was added to the polyisocyanate, the reaction began as evidenced by the evolution of carbon dioxide and the generation of an exotherm within the vessel.

The resulting products were rigid foam products which, under infrared analysis, were characterized by carbodiimide linkages.

The following table, Table II, sets forth the ingredients and amounts thereof used to prepare the foams, as well as the initiation temperature.

It should be noted that in each instance where plasticizers, surfactants, and the like were used, they were incorporated into the catalyst blend to facilitate their introduction.

TABLE II.—CARBODIIMIDE FOAMS FROM CATALYST BLEND

| Example | TDI [1] | MDI [2] | TMT | TDH [3] | Plasticizer [6] | Surfactant [6] | Initiation temp., ° C. | Exotherm, ° C. | Foam density |
|---|---|---|---|---|---|---|---|---|---|
| X | 30 | 70 | 2.0 | 1.0 | 1.33 | .67 | 50 | 140 | 2.75 |
| XI | 40 | 60 | 2.0 | 1.0 | 1.33 | .67 | 50 | 161 | 2.00 |
| XII | 20 | 80 | 2.0 | 1.0 | 1.33 | .67 | 50 | 180 | 4.37 |

See footnotes 1, 2, 3, and 6, Table I, above.

EXAMPLE XIII

This example illustrates the flame retardance and weight retention properties of the foams of the present invention.

The foams of Examples III–XI were flame tested in accordance with the Butler Chimney Test as described by Krueger et al., SPE 25th Antec, v. XIII, Detroit, Mich., 1967, pp. 1052–1057. The results of this test are set forth below in Table III.

TABLE III

| Example foam | Percent weight retention | Flame height [1] | Smoke |
|---|---|---|---|
| III | 88 | C– | Medium. |
| IV | 96 | B | Light. |
| V | 98 | A | Do. |
| VI | 67 | D | Medium. |
| VII | 65 | D | Do. |
| VIII | 98 | C–B | Do. |
| IX | 97 | B | Do. |
| X | 97 | B | Light. |
| XI | 92 | C | Do. |
| XII | 98 | B | Do. |

[1] Flame height code: A=0–2″ flame height; B=2–5″ flame height; C=5–7″ flame height; C=7–10″ flame height; D=10″ and above flame height.

It can be seen from the above that in most instances these foams provide excellent weight retention and adequate flame retardance with low smoke generation.

We claim:

1. A process for the preparation of a rigid cellular foam, characterized by carbodiimide linkages, comprising: catalytically condensing an organic polyisocyanate in the presence of a catalytically sufficient amount of 2,4,6-tris(N-methylethanolamino)-s-triazine.

2. The process of claim 1 wherein the triazine is employed in an amount ranging from about 0.1 to 20 parts by weight thereof per 100 parts by weight of organic polyisocyanate.

3. The process of claim 2 wherein the condensation commences at a temperature from about 25° C. to about 100° C.

4. The process of claim 1 wherein the triazine is used conjointly with an isocyanate trimerization compound selected from the group consisting of (1) 1,3,5-tris(N,N-dialkylaminoalkyl) - s - hexahydrotriazine, (2) 2,4,6-tris-(dimethylaminomethyl) phenol, (3) o-, p- and a mixture of o- and p-dimethylaminomethyl phenol, and (4) an organotin compound of the formula (R″)₃SnOR‴ wherein R″ is selected from the group consisting of alkyl, aryl and alkenyl and R‴ is selected from the group consisting of alkyl, aryl, alkenyl and —SnR₃ to provide a co-catalyst system.

5. The process of claim 4 wherein the condensation reaction is initiated at a temperature ranging from about 25° C. to 100° C.

6. The process of claim 5 wherein the co-catalyst system is used in an amount ranging from about 0.1 to 20 parts by weight thereof per 100 parts by weight of organic polyisocyanate.

7. The process of claim 6 wherein the isocyanate trimerization compound is used in a weight ratio of triazine to trimerization promoting compound ranging from 1:10 to 10:1.

8. The process of claim 4 wherein the isocyanate trimerization compound is 1,3,5-tris(N,N-dialkylaminoalkyl)-s-hexahydrotriazine.

9. The process of claim 8 wherein the 1,3,5-tris(N,N-dialkylaminoalkyl)-s-hexahydrotriazine is 1,3,5-tris(N,N-dimethyl-3-aminopropyl)-s-hexahydrotriazine.

10. The process of claim 4 wherein the isocyanate trimerization compound is an organotin compound.

11. The process of claim 4 wherein the organotin compound is either tri-n-butyltin methoxide, bis(tri-n-butyltin) oxide, or bis(triphenyltin)oxide.

12. The process of claim 4 wherein the organic polyisocyanate is represented by the formula:

$$R(NCO)_z$$

wherein R is a polyvalent organic radical selected from the group consisting of aliphatic and aromatic radicals and z is an integer corresponding to the valence of R and is at least 2.

13. The process of claim 12 wherein the organic polyisocyanate is selected from the group consisting of toluene diisocyanate, methylene diphenyl diisocyanate, and mixtures thereof.

14. The process of claim 1 wherein the organic polyisocyanate is represented by the formula:

$$R(NCO)_z$$

wherein R is a polyvalent organic radical selected from the group consisting of aliphatic and aromatic radicals and z is an integer corresponding to the valence of R and is at least 2.

15. The process of claim 14 wherein the organic polyisocyanate is selected from the group consisting of toluene diisocyanate, methylene diphenyl diisocyanate, and mixtures thereof.

References Cited

UNITED STATES PATENTS

| | | | |
|---|---|---|---|
| 3,657,161 | 4/1972 | Bernard | 260—2.5 AW |
| 3,645,923 | 2/1972 | Kan | 260—2.5 AC |
| 3,620,986 | 11/1971 | Diehr | 260—2.5 AC |
| 3,573,301 | 3/1971 | Winter | 260—249.8 |
| 3,580,868 | 5/1971 | Diehr | 260—2.5 AC |

DONALD E. CZAJA, Primary Examiner

C. W. IVY, Assistant Examiner

U.S. Cl. X.R.

260—2.5 AC, 2.5 AW